July 27, 1926.                T. V. BUCKWALTER                1,594,149
                         RAILWAY CAR AXLE CONSTRUCTION
                             Filed March 10, 1926
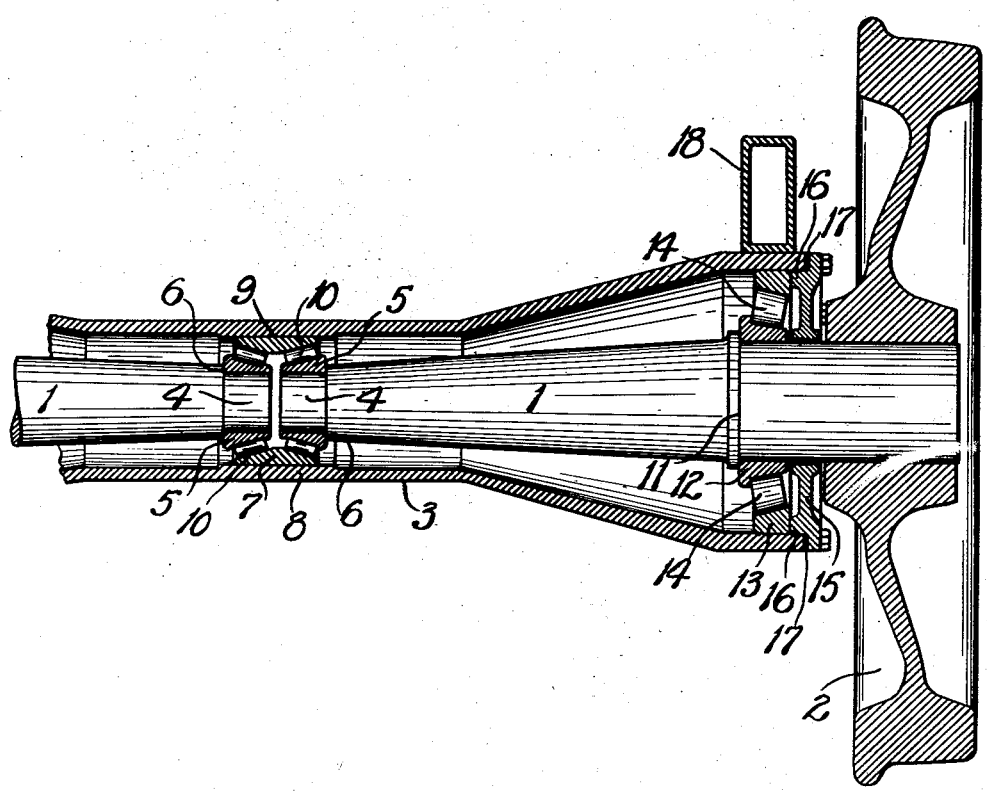
INVENTOR:
Tracy V. Buckwalter,
by Cannot Camer,
                HIS ATTORNEYS.

Patented July 27, 1926.

1,594,149

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

RAILWAY-CAR-AXLE CONSTRUCTION.

Application filed March 10, 1926. Serial No. 93,638.

My invention relates to railway car axles and has for its principal object a construction which is simple and economical to manufacture, to assemble and dismount and to repair. The invention consists principally in a railway car axle construction comprising an axle housing and a two part axle therein, the inner ends of said axle sections being spaced apart and supported by conical roller bearings, the two roller bearings having a common cup or outer bearing member that is loosely disposed in the axle housing, so as to be capable of movement therein.

The accompanying drawing is a sectional view of a railway car axle construction embodying my invention.

Axle sections 1 having wheels 2 on their outer ends are disposed in an axle housing 3. The inner ends 4 of said axle sections 1 are spaced apart. Mounted on the inner end 4 of each axle section is the cone 5 or inner bearing member of a conical roller bearing. In the drawing the end portions 4 of the axle sections 1 are illustrated as being reduced in diameter, so that each cone 5 abuts against a shoulder 6 on its axle section. A doubly coned cup 7 or outer bearing member is loosely disposed in the axle housing 3. Preferably the portion of the axle housing 3 in which said cup is mounted comprises an inner peripheral band 8 that is machined or otherwise smoothly finished, and the outer surface 9 of the cup 7 is likewise smoothly finished, so that the cup 9 is free to slide in its mounting. Conical rollers 10 are interposed between the conical raceways of the cup 7 and the respective cones.

The outer end 4 of each axle section is preferably provided with a shoulder 11 disposed inside of the housing 3, against which shoulder abuts the cone 12 or inner bearing member of a conical roller bearing. The cup 13 or outer bearing member therefor is mounted in the end of the axle housing 3 and conical rollers 14 are interposed between the cup 13 and cone 12. Each end of the axle housing is provided with an end closure ring 15 that has an inwardly extending annular rib 16 that abuts against a cup 13. Shims 17 are interposed between each ring 15 and the end of the housing so as to permit adjustment of the bearings.

The truck side frames 18 rest on the end of the axle housing above the outer conical roller bearings.

The floating fit of the double cup of the inner sets of roller bearings permits thrusts to be transmitted from one end of the axle to the other. It likewise permits easier adjustment of all of the bearings. The axle housing is simple to construct and requires a minimum amount of expensive machining work. Either axle section may easily be removed for repair or replacement.

What I claim is:

1. A railway car axle construction comprising an axle housing and axle sections therein, and a support in said housing for the inner ends of said axle sections, said support being slidable in said housing.

2. A railway car axle construction comprising an axle housing, axle sections disposed in said housing, and conical roller bearings interposed between the inner ends of said axle sections and said axle housing, said conical roller bearings having a common outer bearing member, said outer bearing member being loosely mounted in said axle housing.

3. A railway car axle construction comprising an axle housing, axle sections disposed in said housing, conical roller bearings interposed between the outer ends of the axle sections and the outer ends of said housing, conical roller bearings interposed between the inner ends of said axle sections and said axle housing, said last mentioned conical roller bearings having a common outer bearing member said outer bearing member being loosely mounted in said axle housing, and means for adjusting said bearings.

4. A railway car axle construction comprising an axle housing, axle section disposed in said housing, conical roller bearings interposed between the outer ends of the axle section and the outer ends of said housing the rollers of said bearings being disposed with their smaller ends outermost and the cones thereof abutting against shoulders provided therefor on said axle sections, conical roller bearings interposed between the inner ends of said axle sections and said axle housing, said last mentioned conical roller bearings having a common outer bearing member said outer bearing member being loosely mounted in said axle housing, and closure members in the ends of said housing said closure members having portions abutting against said cups of said outer bearings.

5. A railway car axle construction comprising an axle housing, axle sections therein, a support in said housing for the inner ends of said axle sections, said support being slidable in said housing, and antifriction rollers interposed between the inner ends of said axle sections and said support therefor.

Signed at Canton, Ohio, this 3d day of March 1926.

TRACY V. BUCKWALTER.